United States Patent [19]

Hiltwein

[11] Patent Number: 5,131,764
[45] Date of Patent: Jul. 21, 1992

[54] SECURING DEVICE FOR A SET COLLAR

[75] Inventor: Hans-Peter Hiltwein, Waghäusel, Fed. Rep. of Germany

[73] Assignee: Heidelberger Druckmaschinen AG, Heidelberg, Fed. Rep. of Germany

[21] Appl. No.: 612,784

[22] Filed: Nov. 14, 1990

[30] Foreign Application Priority Data

Nov. 14, 1989 [EP] European Pat. Off. ............ 3937788

[51] Int. Cl.$^5$ ............................................. F16C 19/30
[52] U.S. Cl. ............................................. 384/585; 384/540
[58] Field of Search ............ 384/540, 428, 248, 255, 384/537, 585, 541

[56] References Cited

U.S. PATENT DOCUMENTS

| 1,583,562 | 5/1924 | Stenner | 384/540 |
| 1,638,747 | 8/1927 | Runge | 384/540 |
| 3,236,572 | 2/1966 | White | 384/541 |

Primary Examiner—Lenard A. Footland
Attorney, Agent, or Firm—Herbert L. Lerner; Laurence A. Greenberg

[57] ABSTRACT

Securing device for a set collar formed with a thread by which it is threadedly secured to a conterpart formed with a corresponding mating thread for adjusting between a stop and a first end face of the set collar an assembly of components engaging the stop, includes a device for retaining the set collar and the counterpart threadedly secured to one another, the retaining device being formed as at least part of a ring tightly engaging the counterpart so as to be fixed against relative rotation therewith and being simultaneously in engagement with a second end face of the set collar disposed on a side of the set collar opposite to a side thereof whereon the first end face thereof is disposed.

3 Claims, 3 Drawing Sheets

SECURING DEVICE FOR A SET COLLAR

The invention relates to a securing device for a set collar or adjusting ring which, more particularly, is provided with a thread by which it is threadedly secured to a counterpart formed with a corresponding mating thread so that an assembly of components engaging a stop is adjusted between the stop and a first end face of the set collar.

Securing devices of this general type are employed, for example, for securing the play or clearance of an axial bearing set by means of the set collar. In this case, the assembly of components is made up of bearing rings and roller bodies.

A set collar formed with a thread, for example, constructed as a nut, and having a position which is to be secured with the aid of a lock-nut, has become known heretofore in the state of the art, for example, from a company publication of Kugelfischer Georg Schaefer & Co., Schweinfurt, Germany, Publ. No. 00 200 DA—1970 edition, page 15, in an article entitled "Die Gestaltung von Waelzlagern" ("The Design of Roller Bearings"). To adjust the axial play of an axial bearing, the nut is accordingly screwed onto a counterpart to an extent that a predetermined axial play or clearance exists. The position of this nut is then secured by suitably tightening the lock or counter-nut. During the tightening of a nut, however, an exchange of sides occurs during the thread engagement thereof with a counterpart, which can result in a change in the position of the reversely tightened nut, and a consequent change in the previously adjusted axial play.

Another heretofore known measure for securing a set collar constructed as a nut lies in providing the nut with a threaded bore extending transversely to the threaded bore of the nut-like set collar, and a locking screw directed into the transversely extending threaded bore, as described in "Lagerungsbeispiele" ("Examples of Bearings"), a company publication of SKF, Dd 4605 A 1.66. Reg. 077 73, page 97. In this publication, the thread of the nut, which is located in the vicinity of the locking screw, is withdrawn from the counter-thread during the tightening of the locking screw. Such a deformation of the nut may, however, cause a run-out error on a bearing collar adjusted by means of the nut.

In addition, a securing device for a set collar for adjusting an inclined ball bearing has become known heretofore, which exhibits a given similarity to a securing device wherein a cotter or splint pin engages in a crown or castle nut; however, in this case, a hole corresponding to a splint or cotter-pin hole is provided in an adjusting or lock nut, while recesses corresponding to the recesses of a castle nut intended for engagement by a splint or cotter pin are provided in the casing of a sleeve or hollow shaft and, instead of a splint pin, a screw fastened in the splint pin hole is provided, having a head which projects into one of the aforementioned recesses, as disclosed in "Lagerungsbeispiele" ("Examples of Bearings"), company publication of SKF, Dd 4605 A 1.66. Reg. 077 73, page 63, FIG. 3. In this case, it is possible to secure the set collar only in predetermined rotational positions thereof with respect to the sleeve shaft. This securing device is therefore not suitable for continuous adjustment of a bearing clearance or play.

The bearing play or clearance of, for example, printing unit cylinders of a multi-color rotary printing machine has a particular importance in that mackling or ghosting phenomena are associated therewith. One of the possible fields of application of the invention, however, lies in the bearing of printing-unit cylinders. For the aforementioned reason of possible mackling or ghosting, i.e., blurring, phenomena, great demands are also made with respect to freedom of play, in particular, upon axial bearings. Slight differences in the axial adjustment of bearing rings or collars occurring at the circumference of an axial bearing may, indeed, result in a run-out error of the axial bearing, which produces oscillation or vibration of a printing-unit cylinder and, consequently, mackling or ghosting phenomena. It is, accordingly, an object of the invention to provide a securing device for a set collar which overcomes the hereinafore-mentioned disadvantages of heretofore-known devices of this general type and which permits the position of a set collar of a bearing to be fixed, without causing any so-called run-out errors.

With the foregoing and other objects in view there is provided, in accordance with the invention, a securing device for a set collar formed with a thread by which it is threadedly secured to a counterpart formed with a corresponding mating thread for adjusting between a stop and a first end face of the set collar an assembly of components engaging the stop, comprising means for retaining the set collar and the counterpart threadedly secured to one another, the means being formed as at least part of a ring tightly engaging the counterpart so as to be fixed against relative rotation therewith and being simultaneously in engagement with a second end face of the set collar disposed on a side of the set collar opposite to a side thereof whereon the first end face thereof is disposed.

In accordance with a more specific aspect of the invention, there is provided a securing device for a set collar formed with a thread by which it is threadedly secured to a counterpart formed with a corresponding mating thread for adjusting between a stop and a first end face of the set collar an assembly of components engaging the stop, comprising a securing member coaxially adjustable with respect to the set collar and having means for affixing the securing member to the counterpart, the securing member and the set collar having mutually alignable recesses formed therein, and including an indexing component common to the set collar and the securing member, the indexing member being simultaneously receivable in the recesses formed in the set collar and in the securing member when the recesses are in alignment.

In accordance with an alternate specific aspect of the invention, there is provided a securing device for a set collar formed with a thread by which it is threadedly secured to a counterpart formed with a corresponding mating thread for adjusting between a stop and a first end face of the set collar an assembly of components engaging the stop, comprising a securing member formed as a radially resilient, slotted retaining ring firmly clampable to the counterpart, the securing member being simultaneously engageable with a second end face of the set collar disposed on a side of the set collar opposite to a side thereof whereon the first end face thereof is disposed.

The construction of the invention, however, together with additional objects and advantages thereof will be best understood from the following description of the specific embodiment when read in connection with the accompanying drawings.

Common to both of these constructions is a securing member which is assigned to a respective set collar and which is able to be fixed to a counterpart without any reactive effect upon the assembly of components adjusted by the set collar.

The decisive advantage of a securing device according to the invention is that the set collar, for its part, can be fixed in adjustable positions without any kind of deformation.

Other features which are considered as characteristic for the invention are set forth in the appended claims.

Although the invention is illustrated and described herein as embodied in a securing device for a set collar, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

Figure 5:
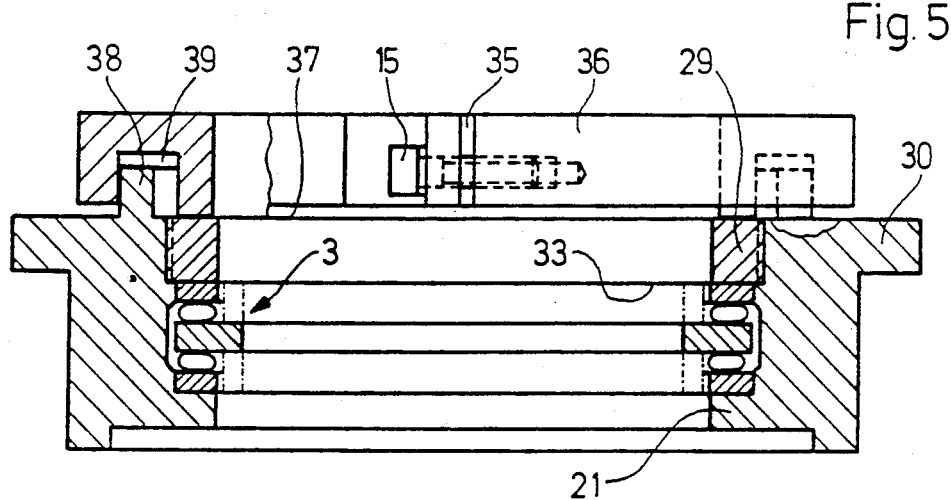
FIG. 5 is a longitudinal sectional view of another embodiment of the securing device for a set collar which is screwed into a bearing bushing, a securing component constructed as a radially resilient or springy set collar being firmly clampable on a cylindrical extension of the bearing bushing.
Figure 6:
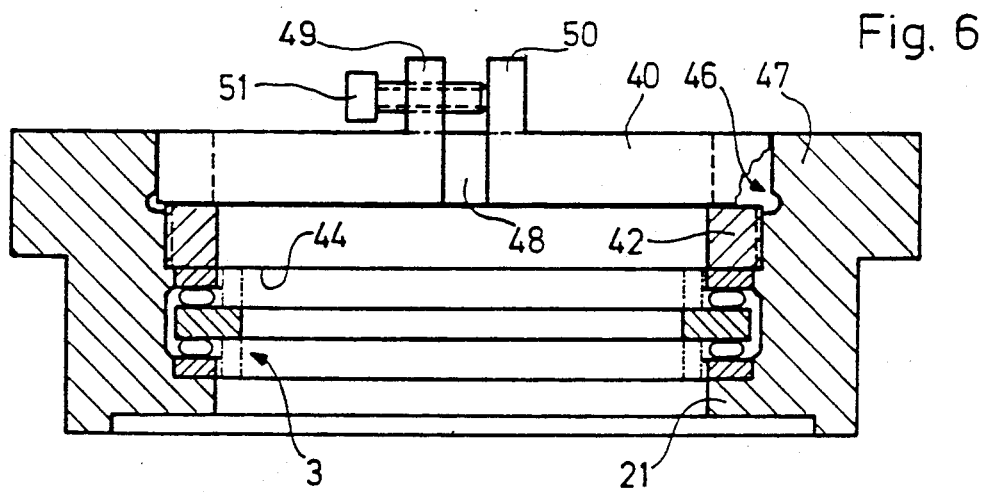
Figure 7:
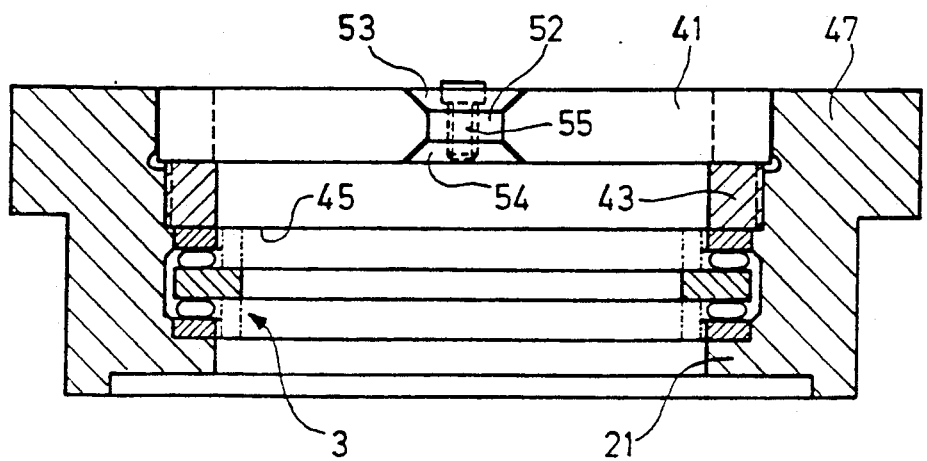

FIG. 6 is a view like that of FIG. 5 of another embodiment of the securing device for a set collar which is screwed into a bearing bushing, a securing component constructed as a radially resilient set collar being firmly clampable by splaying in a bore formed in the bearing bushing; and FIG. 7 is another view like that of FIG. 5 of a further embodiment of the securing device for a set collar which is screwed into a bearing bushing, a securing component constructed as a radially resilient set collar being firmly clampable by splaying in a bore formed in the bearing bushing, the splaying means employed therein being of different construction from that of the splaying means shown in FIG. 6.

Figure 1:
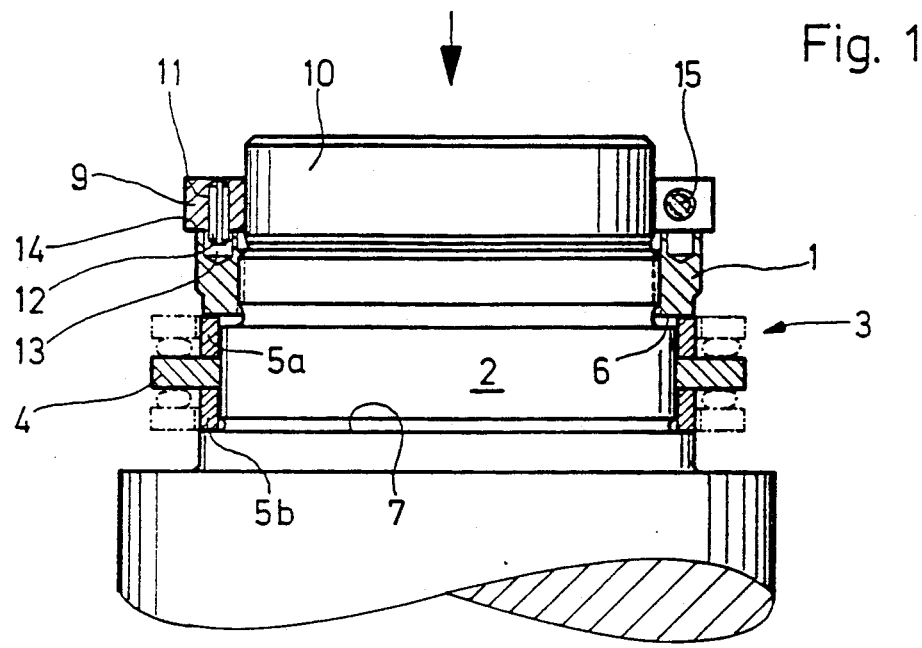
FIG. 1 is a longitudinal sectional view of a device for securing a set collar in accordance with the invention which is screwable on a bearing pin or journal.
Figure 2:
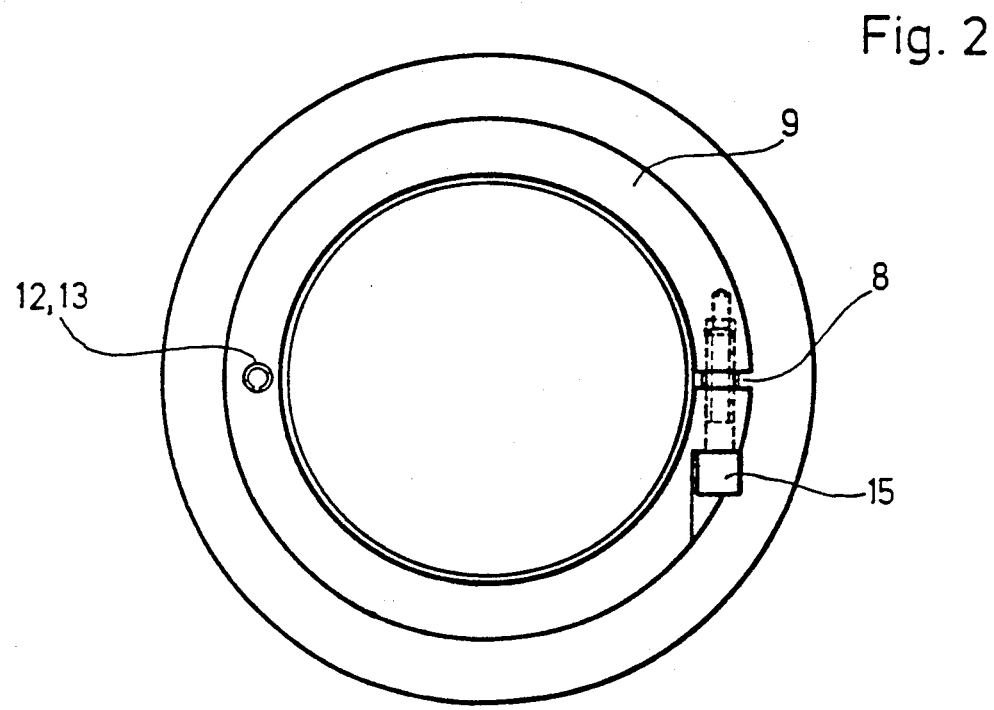
FIG. 2 is an end view of FIG. 1 as seen in the direction of the arrow.

Referring now to the drawing and, first, particularly to FIG. 1 thereof, there is shown therein a securing device according to the invention which is made up of a set collar or adjusting ring 1 formed with an internal thread which is screwed onto a counterpart formed with a corresponding external counter-thread and constructed as a bearing pin or journal 2. An assembly of components formed as an axial bearing 3 is assigned to the journal 2 and is made up of a middle bearing ring 4 and a first and second supporting sleeve 5a and 5b, respectively, engaging the middle bearing ring 4 on one and the other sides thereof, all of which are disposed between a first end face 6 of the set collar 1 and a stop formed as a shaft shoulder 7 of the journal 2 and being adjusted through the mutual engagement of the set collar 1 and a first supporting sleeve 5a, of the first supporting sleeve 5a and the middle bearing ring 4, of the middle bearing collar 4 and the second supporting sleeve 5b, and of the second supporting sleeve 5b and the shaft shoulder 7.

In the case at hand, a securing component or member in the form of a securing ring 9 constructed with a slot 8 so as to be radially resilient or springy serves to secure the position thus adopted by the set collar 1. This securing collar 9 is slid onto an offset or stepped portion 10 of the bearing pin or journal 2, and is formed with a recess 11 into which an indexing member in the form of an adapter or clamping sleeve 12 is fitted. The adapter sleeve 12 is thus disposed parallel to the longitudinal axis of the journal 2 and protrudes beyond an end face of the securing ring 9 facing towards the set collar 1. The adapter sleeve 12 is positioned by appropriate turning of the securing ring 9 with respect to the bearing pin or journal 2 and by sliding the securing ring 9 onto the bearing pin or journal 2 so that the adapter sleeve 12 slips into a recess 13 formed in a second end face 14 of the set collar 1 located at an opposite side to the first end face 6 of the set collar 1 and matching the withdrawal sleeve 12.

In the position thus adopted by the securing collar 9, the latter is firmly clamped onto the stepped portion 10 of the journal 2 by a tightening screw 15 assigned to the slot 8. Accordingly, a formlocking connection is created between the set collar 1 and the securing ring 9 firmly clamped for its part, which prevents automatic turning or twisting of the set collar 1 with respect to the bearing pin or journal 2.

A form-locking connection is one which connects two elements together due to the shape of the elements themselves, as opposed to a force-locking connection, which locks the elements together by force external to the elements.

In the embodiment illustrated in FIG. 1, the securing ring 9 is actually in contact with the set collar 1; however, a gap can equally well be provided therebetween. When there is mutual engagement of the securing ring 9 and the set collar 1, on the other hand, a common indexing member may be dispensed with.

Figure 3:
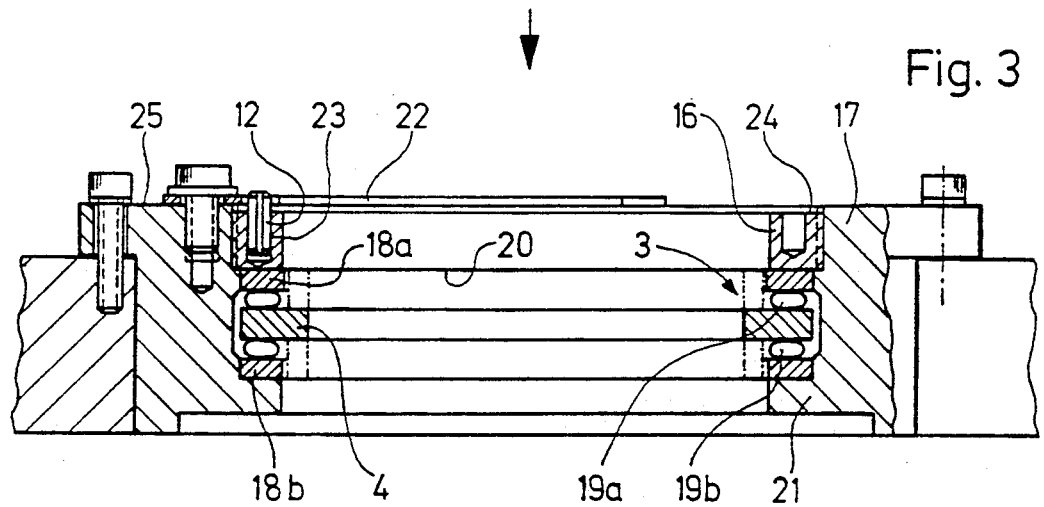
FIG. 3 is a view like that of FIG. 1 of another embodiment of the securing device for a set collar which is screwed into a bearing bushing.
Figure 4:
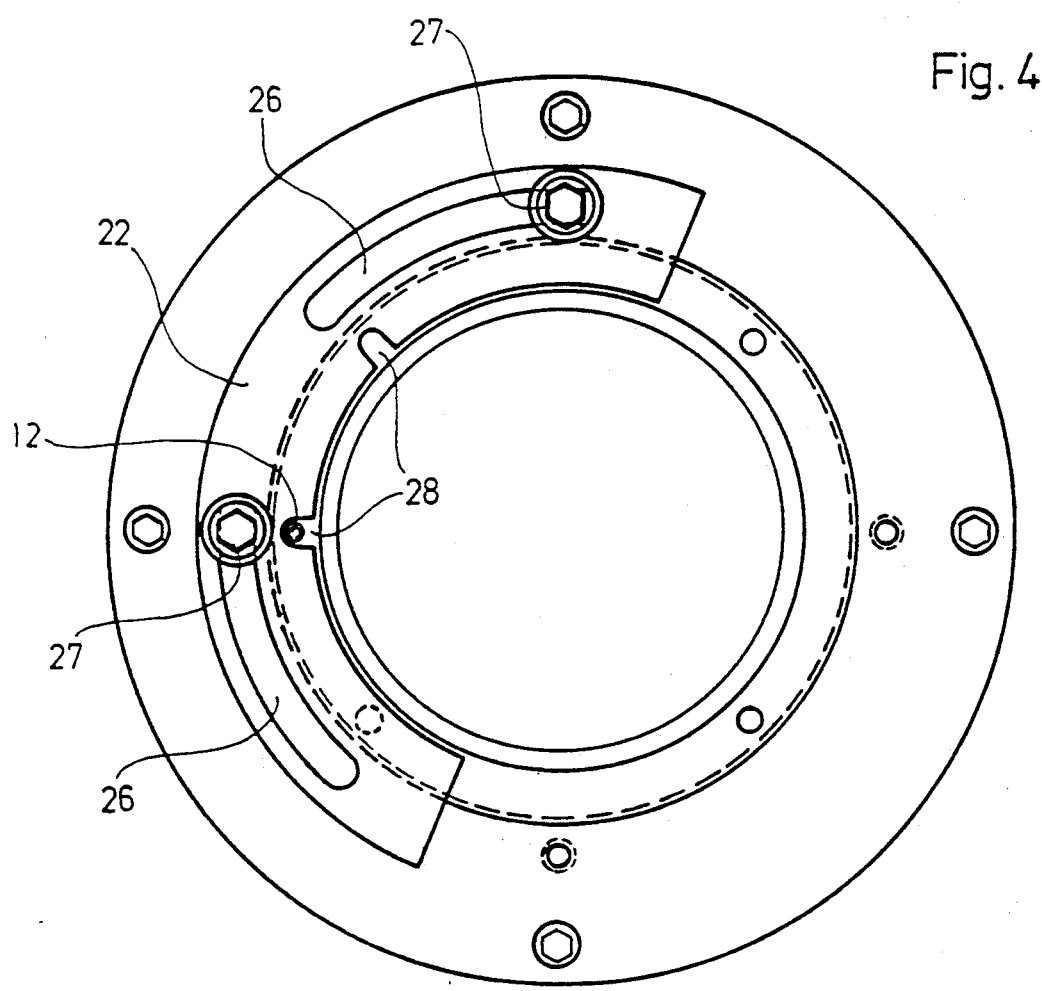
FIG. 4 is an end view of FIG. 3 as seen in the direction of the arrow.

In the embodiment of the securing device illustrated in FIG. 3, a set collar 16 formed with an external thread is screwed into a counterpart formed with a corresponding internal counter-thread and constructed as a bearing bushing 17. An assembly of components constructed as an axial bearing 3 is assigned to the bearing bushing 17. The bearing bushing 17 is made up of a middle bearing ring or collar 4, a first and a second bearing ring 18a and 18b, respectively, located on one and the other sides of the middle bearing ring 4, and first and second roller bodies 19a and 19b positioned between each of the bearing rings 18a and 18b, respectively, and the middle bearing ring or collar 4, the bearing bushing 17 being adjusted by the set collar 16 between a first end face 20 of the set collar 16 and a stop constructed as a circular extension or projection 21 of the bearing bushing 17, with mutual engagement by the set collar 16 and the first bearing ring 18a, by the first bearing ring 18a and the first roller bodies 19a, by the first roller bodies 19a and the middle bearing collar or ring 4, by the middle bearing collar or ring 4 and the second roller bodies 19b, by the second roller bodies 19b and the second bearing ring 18b, and by the second bearing collar 18b and the annular or circular extension 21 of the bearing bushing 17.

In the embodiment of the invention shown in FIG. 3, a securing component in the form of a perforated plate 22 which is constructed as a circular ring segment is used to secure the position thus adopted by the set collar 16.

The set collar 16 is formed with a recess 23 into which an indexing member constructed as an adapter or clamping sleeve 12 is fitted. The clamping sleeve 12 is disposed parallel to the central axis of the bearing bushing 17 and protrudes beyond a second end face 24 of the set collar 16 located on a side of the set collar opposite to that on which the first end face 20 is located.

The perforated plate 22 lies in contact with an end face 25 of the bearing bushing 17 projecting or protruding beyond the second end face 24 of the set collar 16 and is formed with recesses 28 matching the clamping sleeve 12, as well as slots 26 formed as circular arcs and disposed concentrically with the margins or edges of the perforated plate 22 formed as a circular ring segment. The slots 26 are provided for pressure gripping by screws 27, which fasten the perforated plate 22 to the end face 25 of the bearing bushing 17, after it has adopted a position in which, due to appropriate turning thereof about the longitudinal axis of the bearing bushing 17, the clamping sleeve 12 protrudes beyond the set collar 16 and engages in a corresponding one of the recesses 28 formed in the perforated plate 22.

Thus, a form-locking connection is created between the set collar 16 and the perforated plate 22, which prevents automatic twisting or turning of the set collar 16 with respect to the bearing bushing 17.

A third embodiment of the device according to the invention is illustrated in FIG. 5 and once again includes a set collar 29 formed with an external thread which is screwed into a counterpart provided with a corresponding internal counterthread. This counterpart can be regarded as a bearing bushing 30 in which a non-illustrated bearing pin or journal is mounted through the intermediary of an assembly of components forming an axial bearing 3.

The axial bearing 3 is adjusted, by means of the set collar 29, between a first end face 33 of the set collar 29, and the stop 21 formed as an annular extension or projection of the bearing bushing 30.

To secure the position thus adopted by the set collar 29, a retaining ring 36 formed so as to be radially resilient or springy by the provision of a slot 35 therein, and the clamping or tightening screw 15 assigned to the slot 35 are used in this embodiment. A cylindrical extension 38 of the bearing bushing 30 projects beyond a second end face 37 of the set collar 29 which is disposed in a side of the set collar 29 located opposite to that in which the first end face 33 thereof is disposed. The retaining ring 36 is formed with an annular groove 39 on a side thereof facing towards the set collar 29. The retaining ring 36 and the outer diameter of both the annular groove 39 and the cylindrical extension 38 are coordinated with one another so that the retaining ring 36 can be slidingly pushed over the cylindrical extension 38 until it comes into contact with the set collar 29 without the associated end face thereof coming into contact with the bearing bushing 30. The position accordingly assumed by the retaining ring 36 can then be secured or set by the clamping or tightening screw 15 in the manner illustrated in FIG. 5 so that, once again, automatic loosening of the set collar 29 is prevented.

FIGS. 6 and 7 are further embodiments of the securing device according to the invention, wherein a set collar is formed with an external thread, and a slotted retaining ring can be fixed on a counterpart by splaying or expansion instead of by tightening or drawing together.

For this purpose, a suitable retaining ring 40 or 41 is fitted into a shoulder 46 of a counterpart formed as a bearing bushing 47, while being brought into engagement simultaneously with a second end face of a respective set collar 42 or 43 disposed in a side of the respective set collar 42 or 43 located opposite to a side thereof in which the first front face 44 or 45 thereof is disposed, the respective retaining ring 40 or 41 being mounted in the bearing bushing 47 in front of the thread formed therein which is intended for threadedly securing therein the screw-in respective set collar 42 or 43. By expanding or splaying a corresponding retaining ring 40 or 41, it is pressed at the circumference thereof against the wall defining a boring which forms the shoulder 46.

To splay or expand the retaining ring 40 (FIG. 6), lugs 49 and 50 are provided thereon in the vicinity of the slot 48 formed therein, the lugs 49 and 50 being forcibly displaceable away from one another by a tightening screw or turnscrew 51 acting therebetween. To spread or expand the retaining ring 41 (FIG. 7), the ends thereof define a slot 52 therebetween which includes a wedge-shaped slot extension at each end face of the retaining ring 41, wherein respective wedges 53 and 54 are inserted, the wedges 53 and 54 being displaceable towards one another by a tightening screw or turnscrew 55 acting therebetween and, accordingly, effecting a splaying or spreading of the retaining ring 4.

The foregoing is a description corresponding in substance to German Application P 39 37 788.1, dated Nov. 14, 1989, the International priority of which is being claimed for the instant application, and which is hereby made part of this application. Any material discrepancies between the foregoing specification and the aforementioned corresponding German application are to be resolved in favor of the latter.

We claim:

1. Securing device for a set collar formed with a thread by which it is threadedly secured to a counterpart formed with a corresponding mating thread for adjusting between a stop and a first end face of the set collar an assembly of components engaging the stop, comprising means for retaining the set collar and the counterpart threadedly secured to one another, said means being formed as at least part of a ring adjustable in position with respect to the set collar and tightly engaging the counterpart so as to be fixed against relative rotation therewith, said ring being simultaneously in engagement with a second end face of the set collar disposed on a side of the set collar opposite to a side thereof whereon the first end face thereof is disposed.

2. Securing device for a set collar formed with a thread by which it is threadedly secured to a counterpart formed with a corresponding mating thread for adjusting between a stop and a first end face of the set collar an assembly of components engaging the stop, comprising a securing member coaxially adjustable with respect to the set collar and having means for affixing said securing member to the counterpart, said securing member and the set collar having mutually alignable recesses formed therein, and including an indexing component common to the set collar and said securing member, said indexing member being simultaneously receivable in said recesses formed in the set collar and in said securing member when said recesses are in alignment.

3. Securing device for a set collar formed with a thread by which it is threadedly secured to a counterpart formed with a corresponding mating thread for adjusting between a stop and a first end face of the set collar an assembly of components engaging the stop, comprising a securing member formed as a radially resilient, slotted retaining ring adjustable in position with respect to the set collar and firmly clampable to the counterpart, said securing member being simultaneously engageable with a second end face of the set collar disposed on a side of the set collar opposite to a side thereof whereon the first end face thereof is disposed.

* * * * *